United States Patent
Arakelian et al.

[11] 3,869,812
[45] Mar. 11, 1975

[54] COORDINATION TESTING SYSTEM

[75] Inventors: Hagop Arakelian, Broomall; Jeffrey L. Wright, Philadelphia, both of Pa.

[73] Assignee: J. W. Microelectronics Corporation, Philadelphia, Pa.

[22] Filed: Sept. 20, 1973

[21] Appl. No.: 399,094

[52] U.S. Cl............................................... 35/22 R
[51] Int. Cl. ........................................... G09b 19/00
[58] Field of Search .................................... 35/22 R

[56] References Cited
UNITED STATES PATENTS

| | | | |
|---|---|---|---|
| 1,729,227 | 9/1929 | Reid................................ | 35/22 R X |
| 1,953,954 | 4/1934 | Constable ....................... | 35/22 R X |
| 2,870,549 | 1/1959 | Craine............................... | 35/22 R |
| 3,543,418 | 12/1970 | Press................................. | 35/22 R |
| 3,563,230 | 2/1971 | Gibbs............................... | 35/22 R X |
| 3,613,263 | 10/1971 | Schuster .......................... | 35/11 |

*Primary Examiner*—Wm. H. Grieb
*Attorney, Agent, or Firm*—Gerard J. Weiser; Alfred Stapler; Karl L. Spivak

[57] ABSTRACT

A system for testing eye to hand and/or eye to foot coordination, in which the subject being tested employs hand and foot manipulators to control the lighting of selected lamps within banks of such lamps, in an effort to produce patterns of lighted lamps bearing desired spatial relationships to patterns of lighted lamps which are produced in adjacent banks under the control of a fully-transistorized, computer-like control system. The control system imparts great flexibility to the over-all coordination testing system, enabling it to perform a variety of testing and monitoring functions.

8 Claims, 8 Drawing Figures

COORDINATION TESTING SYSTEM

BACKGROUND OF THE INVENTION

The invention described herein was made in the performance of work under NASA contract No. NAS 1-11410 and is subject to the provisions of section 305 of the National Aeronautics and Space Act of 1958 (72 Stat. 435; 42 U.S.C. 2457).

This invention relates to methods of and apparatus for ascertaining the degree of development of certain human faculties. The invention also relates to the possible improvement of such faculties.

More particularly, the invention relates to methods of and apparatus for measuring coordination between eye and hand and/or between eye and foot in human subjects.

It is known to measure such coordination in the following manner.

An apparatus is provided which has two handles to be independently displaced from centered neutral positions by the hands of the subject, and two pedals to be depressed by the feet of the same subject. Each handle and each pedal is coupled to a separate bank of, say, five lamps. Each coupling is such that only one lamp at a time is lit in the associated bank of five, and different ones of those lamps are lit depending on the position of the associated handle or pedal. For example, the five lamps coupled to one of the handles may be positioned in a vertical row, and the middle lamp lit when the handle is in its centered neutral position. The next lower lamp lights, in lieu of the middle lamp, when the handle is displaced part-way in one direction, the lowermost lamp lights when the handle is displaced to its extreme position in the same direction, and so forth. These handle and pedal actuated lamps will be referred to hereafter as "solution" lamps.

Adjacent to each of these banks of lamps is a second similar bank. Again, one lamp at a time lights up in each such bank, but not under the control of the associated handle or pedal.

Instead these second banks of lamps are under the control of an electro-mechanical programmer. This programmer includes a drum-like structure rotatable in steps, and provided with receptacles for protruding indicators.

Microswitches are positioned around the periphery of the drum, where they can be operated by the indicators. These switches control the lighting of one or another lamp in the respective second bank.

By appropriately positioning the indicators relative to the microswitches, various patterns of lamps in the second banks can be lit as the drum is stepped from one position to another. The lamps in these second banks will be referred to as "problem" lamps.

As each pattern is lit, the subject endeavors to adjust the positions of the handles and pedals so as to "match" the pattern, by means of the lamps in those banks which are under handle and pedal control, i.e., by means of the solution lamps.

The facility with which such a match is achieved indicates the subject's degree of coordination.

Other, more sophisticated types of "problems" have also been presented to the subject. For example, it is known to provide separate lamps which, when lit, indicate to the subject that he should not endeavor to exactly match the pattern of problem lamps, but rather to produce a pattern of lit solution lamps displaced in a certain way from an exactly matched pattern.

Such known equipment had certain undesirable limitations. These included the fact that only when all of the limbs of the subject had produced the lighting of solution lamps in the desired pattern (relative to the programmer-actuated problem lamps) was this fact recorded. No provision was made for recording whether less than all of the limbs had succeeded in producing the desired solution lamp pattern and which ones had done so.

The number of problems which could be presented before repetition set in was sharply limited by the electromechanical nature of the programmer used to generate the problems. It has developed that it would be desirable to present a much larger number of such problems without having to reprogram the programmer.

The only way to change the problem type from, say, one requiring matching of the problem lamp pattern by the solution lamp pattern to a problem type which requires deviation from an exact match, was by reprogramming the electromechanical programmer. No provision was made for simply changing the problem types at will without such reprogramming.

The achievement or non-achievement of a solution to a particular problem was evaluated on the basis of all four limbs producing simultaneously the desired solution lamp patterns. There was no provision for making the problem solution contingent upon production of the solution by the individual limbs in a predetermined sequence.

The timing for the presentation of successive problems was determined by the subject being tested and, particularly, by achievement of a solution to the entire problem for all four limbs. No provision was made for progressing to the next problem at a predetermined time, or after lapse of a predetermined interval, irrespective of whether the preceding problem had or had not achieved a solution.

The solution of one problem, which might include not only the achievement of the desired solution lamp patterns but also their being maintained, or "held" for a predetermined interval, was immediately followed by the start of the next problem. No provision was made for delaying the start of the next problem beyond the solution-and-holding time, so as to permit, if desired, the performance of other activities during this delay interval.

SUMMARY OF THE INVENTION

It is an object of the invention to overcome the above limitations.

It is another object to overcome selected ones of these limitations.

It is still another object to provide a system of the general type described which is characterized by great flexibility and is capable of performing a variety of tests of eye-to-hand and/or eye-to-foot coordination.

These and other objects of the invention which will appear are achieved by providing a system having the banks of problem and solution lamps described above, the levers and foot pedals also described above controlling the solution lamps, and sophisticated electronic circuitry for presenting various problems by means of the problem lamps and ascertaining and displaying achievement of solutions thereto.

The invention further involves a method of operating such a system to provide indications of human coordination between eye and hand and/or between eye and foot.

BRIEF DESCRIPTION OF THE DRAWINGS

For further details reference is made to the discussion which follows, in light of the accompanying drawings, wherein.

The same reference characters are utilized in the different figures to designate similar elements.

DESCRIPTION OF THE PREFERRED EMBODIMENT

The Over-all System

Figure 1:
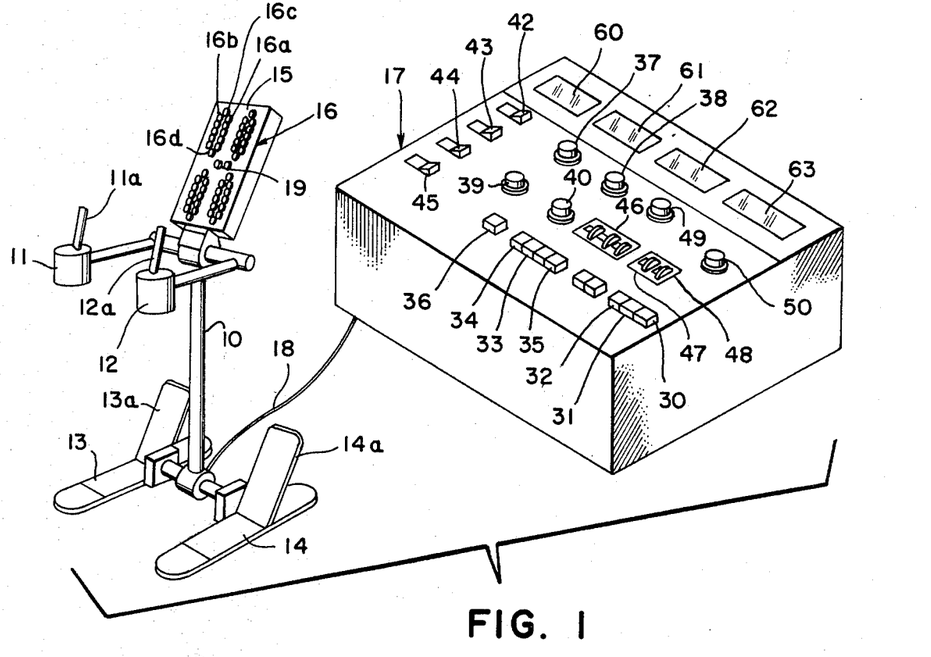
FIG. 1 is an over-all diagrammatic illustration of a preferred form of the system embodying the invention.

Referring now to FIG. 1, this shows the overall arrangement of an embodiment of the invention. It includes a support frame 10 which holds and supports four manipulators 11, 12, 13, and 14. These manipulators are so positioned by the frame that the subject being tested can comfortably sit facing the manipulators and comfortably reach manipulators 11 and 12 with the left and right hand, respectively, and manipulators 13 and 14 with the left and right foot, respectively.

Also supported on frame 10 is a display panel 15 provided with lamps collectively designated by reference number 16, and arranged in four quadrants of the display panel 15. As described more fully hereafter, the lamps 16 grouped in the respective quadrants relate, respectively, to the correspondingly positioned manipulators. Thus, the lamps grouped in the upper left hand quadrant of display panel 15 are related to manipulator 11, and similarly for the other grouped lamps.

There is also a control and display console 17, electrically coupled by connector cable 18 to frame 10 and the equipment supported thereby.

Each of manipulators 11 through 14 may be of conventional form, with provisions for transmitting electrical signals which differ depending on the position of the moveable member of the manipulator. This moveable member is designated in each case by the same reference numeral as the manipulator plus the suffix $a$.

Figure 2:
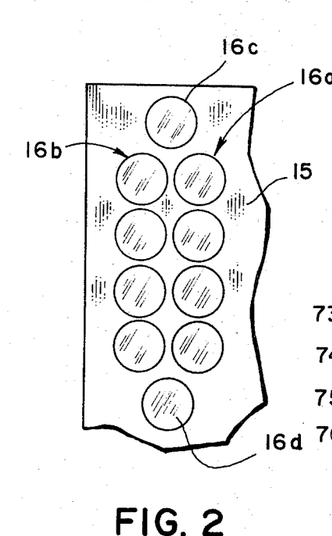
FIG. 2 is an enlarged fragmentary view of a portion of FIG. 1.

Movement of each moveable member by the corresponding limb of the subject being tested produces lighting of one or another of the solution lamps in the bank of the quadrant of lamps associated with that manipulator. For example, movement of handle 11a of manipulator 11 under the control of the left hand of the subject being tested causes lighting of the different lamps in the right-hand row of lamps in the upper left-hand quadrant of display panel 15. The lamps in this upper left hand quadrant are shown in FIG. 2. The right-hand row of five lamps (the solution lamps) is designated by the reference numeral 16a, while the left-hand row (the problem lamps) is designated be the reference numeral 16b. In addition, a lamp 16c is placed above and centered between the left-hand and right-hand rows, and a lamp 16d is placed below and correspondingly centered.

It will be noted that the lamps in rows 16a and 16b are aligned relative to each other.

The lamps in left hand row 16b are also subject to being lit, one at a time, but not under the control of manipulator handle 11a. Rather, these lamps in row 16b are lit under the control of console 17. The purpose of lamps 16c and 16d, which are also under control of console 17, will be discussed later.

The lamp arrangement is similar for each of the other manipulators 12, 13 and 14.

Console 17 causes the lighting of a predetermined problem lamp in each left-hand row 16b of the four groups of lamps on panel 15. The subject being tested is then expected to displace the moveable elements of the various manipulators so as to produce a pattern of lit solution lamps in the right hand rows 16a, bearing a predetermined relationship to the problem lamps.

For example, if neither lamp 16c nor lamp 16d is lit, then the subject being tested is expected to "match" the problem lamps lit in the left-hand rows 16b by the corresponding solution lamps in row 16a. If, on the other hand, a lamp 16c in any given quadrant is lit then the subject being tested is expected to produce lighting of a solution lamp in the same quadrant which is one higher than the problem lamp lit (under the control of console 17) in the same quadrant. This will be referred to as a "one-above" problem. Conversely, if lamp 16d in any given quadrant is lit, then the problem becomes that of causing that solution lamp to light which is one lower than the problem lamp lit under the control of console 17. This will be referred to as a "one-below" problem.

Other variables of interest in connection with the test can be introduced. These include the time within which the desired solution lamp lighting must be accomplished, the length of time during which that condition, once attained, must be held, the sequence in which the various limbs must achieve the desired condition, and so forth.

There are also means for indicating when the time for solution has elapsed, e.g., lamps 19 on panel 15, which light up at such time.

The Control and Display Console

Figure 3:
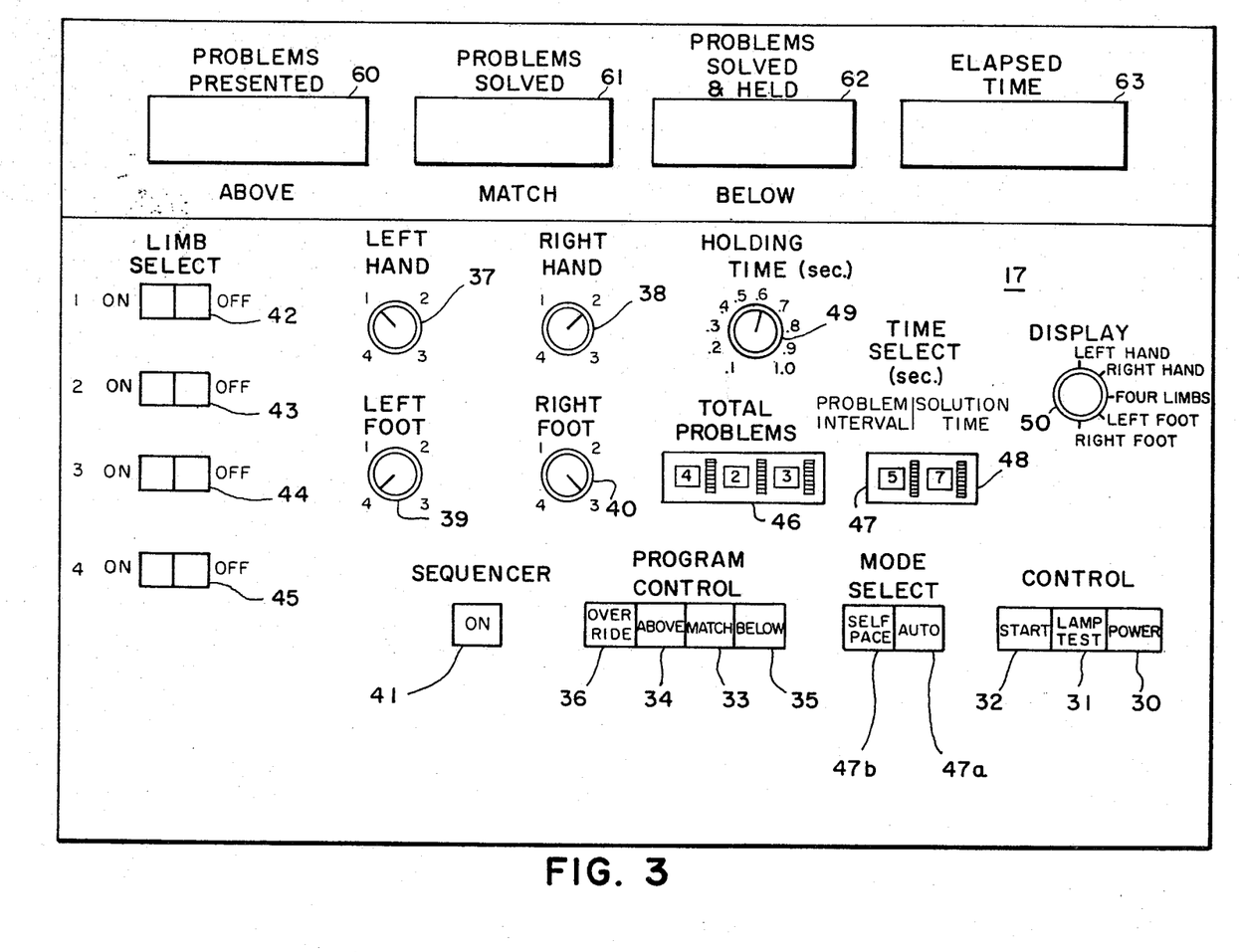
FIG. 3 is a diagrammatic illustration, enlarged with respect to FIG. 1, of the control and display panel forming part of the system.

The outward configuration of control and display console 17 is shown in more detail in FIG. 3, to which reference may now be had. This console comprises a number of operating controls, and displays showing the results of the operation. The operating controls include control switches 30, 31 and 32, which may be of the conventional repeat pushbutton type, and which control, respectively, the application of power to the entire equipment, certain lamp test functions described in more detail hereafter, and the start of any given problem sequence. Such a sequence of problems will be referred to as a "test."

An additional set of four switches 33 to 36, which may be of the conventional off/on pushbutton type, control, respectively, the presentation of match problems, the presentation of one-above problems, the presentation of one-below problems, and the over-riding of the basic program.

A set of four switches 37 to 40, which may be four-position rotary switches, plus a repeat pushbutton switch 41, controls the sequencing of the limb solutions, if such is desired. By means of the respective switches 37 to 40 there is determined the sequence in which the solutions for the four limbs must be produced. Switch 41 then determines whether the sequencing requirement is or is not in effect.

A set of four switches 42 to 45, which may be two-position rocker switches, determines how many of the limbs of the subject being tested will be involved. Each switch controls one limb, and only those limbs for which the corresponding switch is set into the "on" position are involved in the test.

A switch set 46 controls the total number of problems to be presented, one after the other, as part of the test. This switch set may comprise three decimal thumbwheel display type switches. By adjustment of these switches any number from 1 to 999 can be selected, and this number is simultaneously displayed by means of the digits appearing on the face of the thumbwheel switches. In FIG. 3, the number 423 is displayed by switch set 46. Under these conditions, a total of 423 problems are presented, one after the other, before the test is considered completed.

There are also provisions for adjusting three kinds of time intervals.

Switch 47, which may also be a thumbwheel display type switch, controls the interval between successive problems, provided the system is in that mode in which that interval is predetermined rather than being dependent upon the achievement of a solution by the subject being tested. The length of the interval so set is displayed on the switch itself.

The mode in which the interval is predetermined is referred to as the "auto" mode. The mode in which the achievement of a solution causes the presentation of the next problem is referred to as the "self-pace" mode.

Selection of one or the other of these modes (auto or self-pace) is accomplished by depressing pushbutton switches 47a and 47b respectively.

Another switch 48, which may also be a thumbwheel display type switch, controls the time interval available for solution of each problem, once that problem has been presented by the establishment of a predetermined pattern of lit problem lamps on panel 15 (FIG. 1). The length of this time interval is also displayed on the switch itself.

Another switch 49, which may be a multiposition rotary switch, determines the time interval for which a solution, once achieved, must be held before the problem is considered to have been successfully solved.

The capability of displaying various items of numerical information is also provided on control and display console 17.

This involves four separate alpha-numeric displays 60 through 63, three of which serve dual functions.

Display 63 shows elapsed time, namely, the time from each pressing of start switch 32. The operation of display 63 stops upon completion of the total number of problems selected by switch 46.

Displays 60, 61 and 62 show different information, depending on the setting of display switch 50, which may be a rotary five-position switch. When switch 50 is in the "four-limbs" position, then display 60 shows the number of problems presented up to any given moment, display 61 shows the number of problems with respect to which the desired solution lamp pattern has been obtained, however briefly, by means of the manipulators 11 to 14, and display 62 shows the number of times such solutions have been obtained, and also held for the holding period determined by switch 49.

In any of the other positions of display switch 50, identifying one or another individual limb, the following information is shown on displays 60 to 62. On display 60, there is shown the number of times that a one-above problem has been solved by the individual limb identified by display switch 50 and the solution held for the time determined by switch 49. Display 61 shows the same information for match problems and display 62 shows the same information for one-below problems.

Each of displays 60 to 63 may be of conventional form utilizing, for example, incandescent line segment digits actuated in conventional manner.

The Electronic Elements

Figure 4:
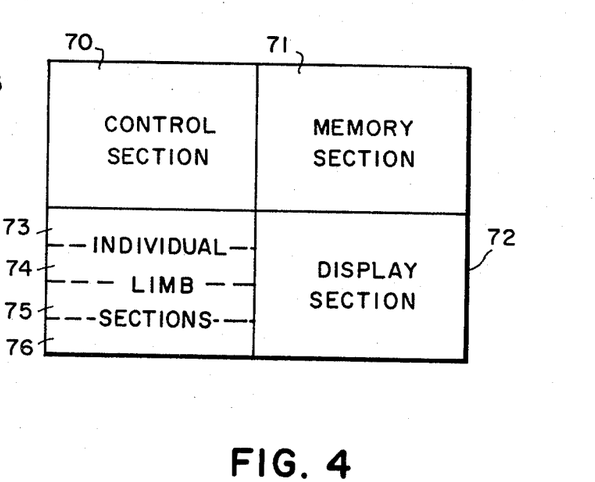
FIG. 4 is a greatly simplified block diagram of the electronic elements of the system.

Turning now to the electronic elements of the system, reference is made to FIG. 4, which shows the general organization of these elements. They consist of a control section 70, a memory section 71, a display section 72, and individual limb sections 73, 74, 75 and 76. Each individual limb section is associated with those functions of the system which are replicated for the four different limbs to be tested.

It will be understood that this division into sections is made for convenience of illustration and description and that there is interaction between them so that portions of various sections are involved to some degree in the performance of the functions of others.

Generally speaking, however, control section 70 is concerned with the activation of the entire system, including the progression of the presentation from one problem to the next, the timing functions to be performed, and so forth.

Memory section 71 is concerned with the generation of the program which defines, successively, the different problems to be presented by means of the problem lamp banks of panel 15 (FIG. 1). The individual limb sections 73 to 76 are concerned, respectively, with determining whether or not each individual problem has been solved by the particular limb to which it was presented. Each individual section performs this function for one individual limb.

Finally, display section 72 is concerned generally with controlling and activating the display of information concerning the solution or non-solution of the problems presented, by means of alpha-numeric displays 60 to 63 (FIG. 3).

Figure 5:
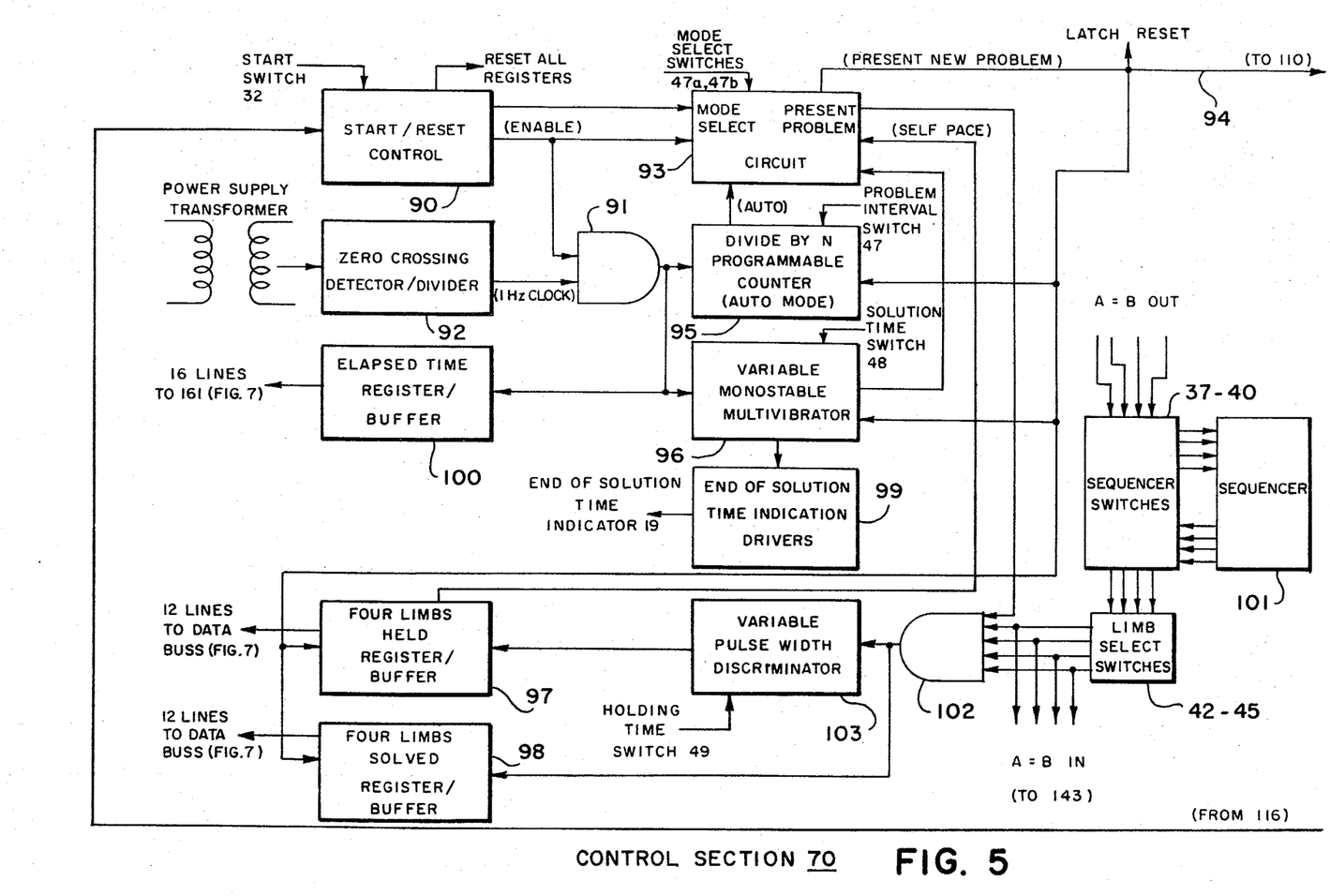
FIGS. 5 through 8 are more detailed block diagrams of the constituent elements of FIG. 4.
Figure 6:
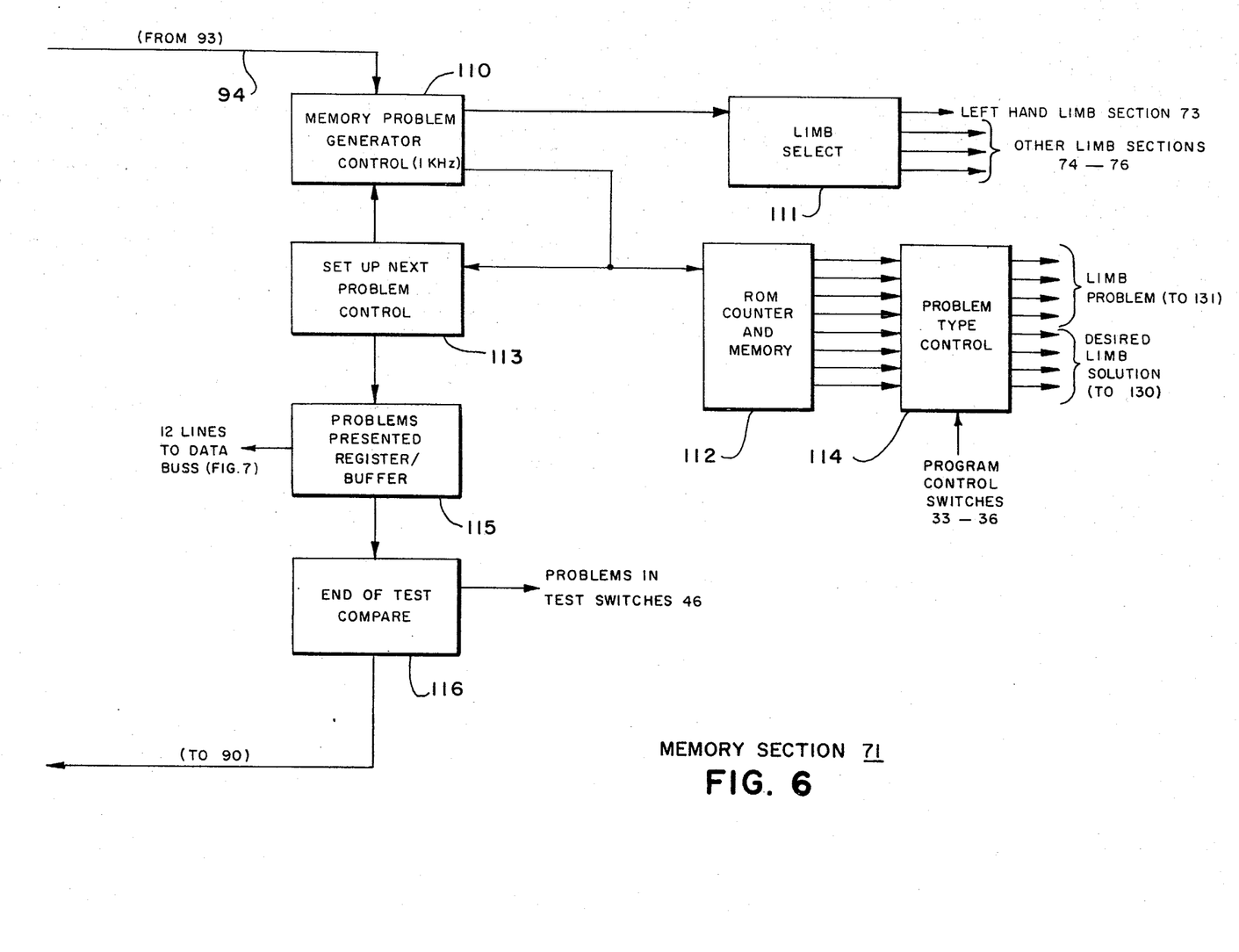
Figure 7:
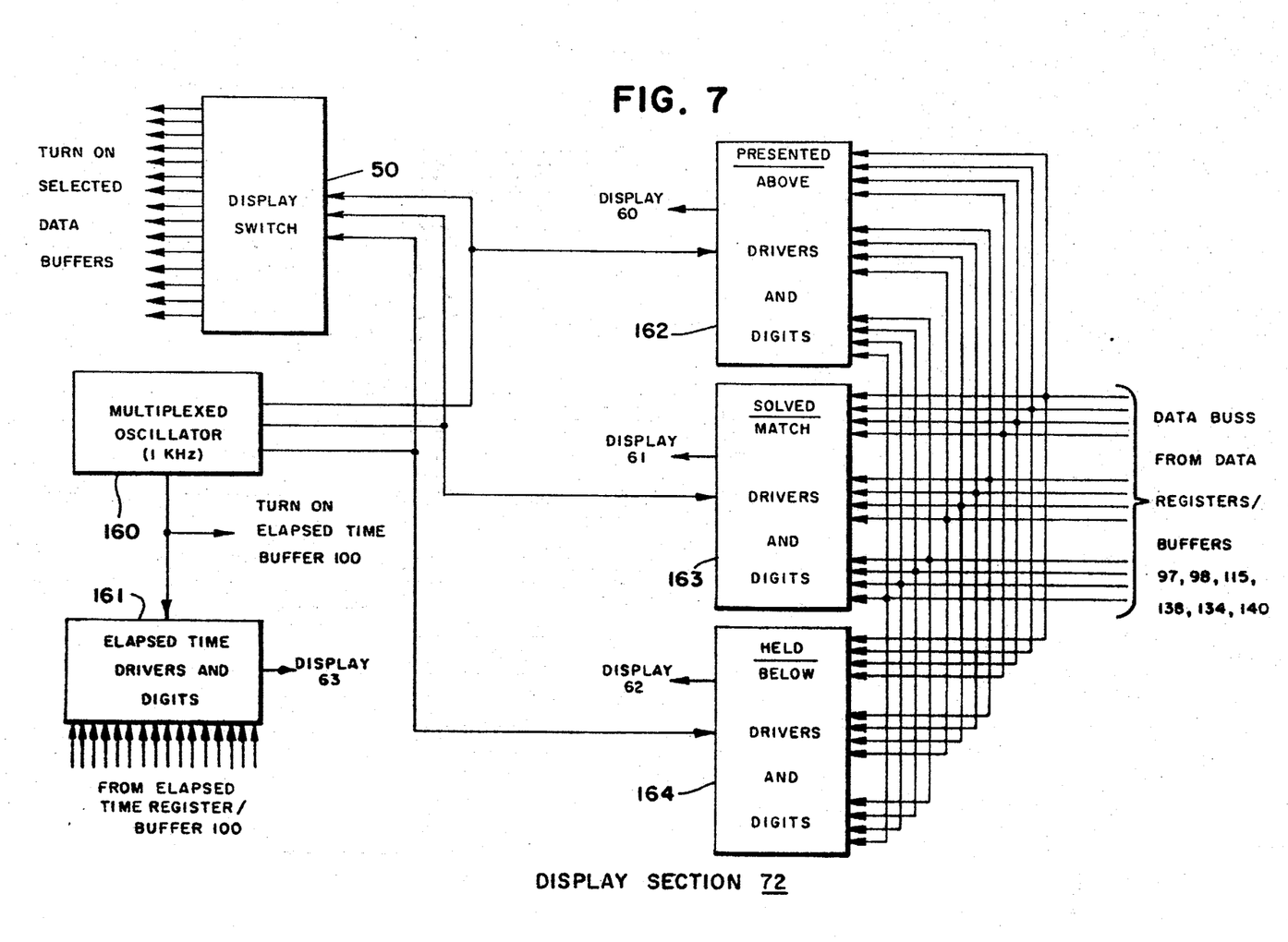
Figure 8:
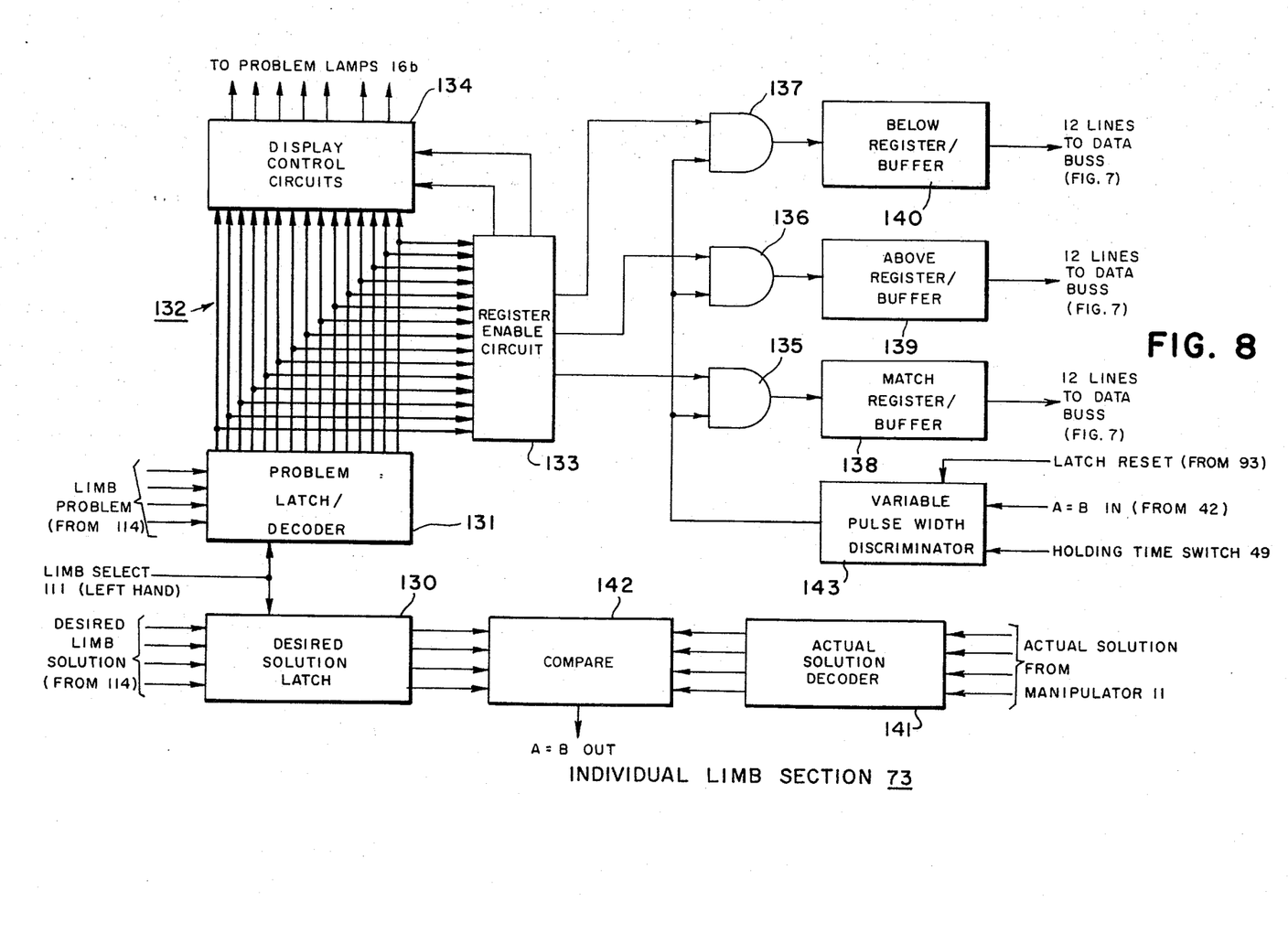

Further details concerning the contents of these sections are presented with references to FIGS. 5 through 8, collectively. Specifically, FIG. 5 is a block diagram of control section 70, FIG. 6 is a block diagram of memory section 71, FIG. 7 is a block diagram of display section 72 and FIG. 8 is a block diagram of individual limb section 73. It will be understood that limb section 73 is representative of all four limb sections 73 to 76 and is associated with one specific limb, e.g., the left hand, of the subject being tested.

When start button 32 (FIG. 3) is pressed, a master reset signal is generated in start/reset control circuit 90 (FIG. 5) and this signal resets all registers and buffers throughout the sections represented in FIGS. 5 through 8 to zero, and sets all latch and counting circuits in these sections to their initial states. Also an "enable" signal is generated by control circuit 90 that enables an AND gate 91. The other input to AND gate 91 is from a zero-crossing detector/divider circuit 92. This circuit is supplied with A-C line power, and counts down a line frequency pulse train derived from the line signal to a 1 Hz square wave. This square wave serves as the master clock for the system. The enable signal from control circuit 90 also enables the mode select/present problem circuit 93. Circuit 93 comprises a group of gates which decode the mode select switches 47a and 47b and trigger the presentation of a new problem, when required, via connection 94 leading to memory section 71 (FIG. 6).

When the start button is released, another signal is sent to the mode select/present problem circuit 93, causing the first problem to be presented.

Each time a new problem is to be presented circuit 93 puts out a very narrow width, negative pulse. This pulse goes to the divide by N programmable counter 95. It comprises a four bit binary counter and storage element which senses the complement of the time set in by thumb wheel switch 47 (FIG. 3) and loads this into the four output bits when strobed by each 1 Hz pulse from AND gate 91, then increments the counter/storage element until a count of 15 is reached. This is sensed by a four input NAND gate within counter 95 which then sets an R-S flip-flop.

The same narrow pulse from circuit 93 also goes to variable monostable multivibrator 96. This comprises four bit binary counter and storage elements and associated NAND gate and R-S flip-flop similar to and operating in a similar way to those described for counter 95. The pulse from circuit 93 strobes the counter and storage elements of multivibrator 96 and resets the D flip-flop. This disables the AND gate and prevents additional 1 Hz clock pulses from gate 91 from triggering the multivibrator 96. The output of the R-S flip-flop is also inverted and used as a signal to clear the multivibrator 96. Thus the output of the multivibrator, which represents the solution and holding time permitted, is high for the number of seconds set on solution time switch 48 (FIG. 3). The D flip-flop is reset and the counter/storage element is strobed when a new problem is presented.

The same pulse from circuit 93 is also applied to fourlimbs held register/buffer 97 and to four limbs solved register/buffer 98. In each it resets an R-S flip-flop.

Finally, as previously noted, the pulse from circuit 93 is applied to memory section 71 (FIG. 6) via lead 94, and particularly to memory problem generator control circuit 110 in memory section 71. This control circuit 110 comprises a free running oscillator operating at a frequency of about 1 KHz. It also comprises an R-S flip-flop set by the new problem signal from circuit 93. This enables an AND gate and a second flip-flop, such that when the above mentioned free running oscillator output goes high, the output of the second flip-flop and the output of the AND gate both go high, thus triggering a monostable multivibrator. The pulse width of the signal from this multivibrator is equal to 3.5 times the period of the oscillator. The output of the monostable multivibrator is used to set an R-S flip-flop whose output is then ANDed with the oscillator to provide the master clock for the rest of the memory section. The output of the monostable vibrator is ANDed with the master clock to provide four positive pulses to the limb select circuit 111 of memory section 71.

Returning to FIG. 5, counter circuit 95, after being strobed by circuit 93 as previously described, counts the 1 Hz master clock pulses generated by circuit 92. When a number of pulses has been counted corresponding to the time interval set on the problem interval thumbwheel switch 47 (FIG. 3), a signal is sent to the mode select/present problem circuit 93 causing a new problem to be presented, provided the mode select switches 47a and 47b (FIG. 3) are in auto mode setting. If they are in self-pace mode, this signal is ignored and a new problem will not be presented.

Like counter 95, multivibrator 96 counts the 1 Hz pulses generated after the multivibrator has been strobed by circuit 93. When a number of pulses has been counted corresponding to the time interval set on solution time thumbwheel switch 48 (FIG. 3), an output signal is produced by multivibrator 96 which activates the end of solution time indication driver circuit 99 and a signal is also sent to circuit 93. If the mode select switches 47a and 47b are in auto mode, the AND gate input to discriminator 96 is disabled. If these switches are in the self pace mode the signal is ignored and the AND gate remains enabled.

Circuit 99, when activated, energizes the end solution time indicating means, such as lamps 19 in FIG. 1.

An elapsed time register/buffer 100 counts the 1 Hz clock pulses reaching it via gate 91, after being reset to zero and having been turned on again by an input signal from a multiplexed oscillator 160 (FIG. 7), as described more fully hereafter.

The resultant output from register/buffer 100 is a 4-digit, 4-bit binary coded decimal (BCD) number representing the elapsed time since production of the enable signal by start/reset control circuit 90 (FIG. 5). The 16 leads carrying the BCD output in parallel are connected to elapsed time driver and digits circuit 161 (FIG. 7), which decodes the BCD number and activates display 63 to cause the elapsed time to register in conventional manner. This decoding and activation is also controlled by multiplexed oscillator 160.

Turning now again to memory section 71 (FIG. 6), when the memory problem generator control circuit 110 is strobed by circuit 93 (FIG. 5), as previously discussed, the 1 KHz clock forming part of circuit 110 is started and pulses sent to read only memory (ROM) counter and memory 112. These pulses are also supplied to the set up next problem control circuit 113, as well as to limb select circuitry 111, as previously discussed. In limb select circuitry 111, each pulse from control circuit 110 increments a two bit counter whose output is fed to a one-of-four decoder. The outputs of the decoder are all high, except for the one selected by the two bit input code. These outputs are then inverted and ANDed with the input pulse which has been delayed through a bank of inverters to provide proper timing, to enable a limb section to accept a problem and a solution word. One limb section is selected for each of the four input pulses. This selection is accomplished by applying the output signal from limb select circuit 111 sequentially through the four output connections shown to the four individual limb sections 73 to 76 (FIG. 4), respectively. For example, the output lead designated left hand limb section 73 in FIG. 6 would be connected to individual limb section 73 (FIG. 8) which has been assumed to be the one associated with the left-hand functions. In limb section 73, the signal from limb select circuit 111 (FIG. 6) enables desired solution latch circuit 130 and problem latch/decoder 131.

In the other limb sections 74 to 76, the corresponding elements would be enabled by the respective outputs from limb select circuitry 111. These outputs are synchronized with the clock within memory problem generator control circuit 110 so that one limb is selected for each clock pulse.

The clock pulses are also counted by the ROM counter and memory circuit 112 and a different word, consisting of 8 bits, is supplied to problem type control circuit 114 in response to each successive clock pulse. The problem type control circuit 114 then may change the coding of the word according to the setting of program control switches 33 to 36 (FIG. 3) as more fully explained hereinafter. The problem portion of the word (represented by four of the eight parallel outputs from problem type control circuit 114) is supplied to problem latch decoder 131 (FIG. 8), and the desired limb solution word (represented by the remaining four outputs) is supplied to the desired solution latch in all four limb sections 73 to 76, e.g., to problem latch decoder 131 and to desired solution latch 130, respectively, in FIG. 8. The output of the problem type control circuit 114 is also synchronized with the master clock in control circuit 110 so that one word is put out for each clock pulse. Thus the first four problem (and desired solution) words are presented to all four limb boards simultaneously, but the limb select circuit 111 enables only one of the limb boards 73 to 76 for each word. In this way, the first four words out of the ROM counter and memory circuit 112 determines the first four-limb problem presented on manipulator display panel 15 (FIG. 1). A subsequent set of four words (but not necessarily the next ones) determines the second four-limb problem, and so forth. With regard to the read only memory, itself, the master clock from the memory problem generator control circuit 110 is inverted and then used to trigger a monostable nultivibrator, whose output pulse width is 3/5 of the period of that master clock and synchronous with it. The clock pulse so stretched is then fed to two binary counters which increment by one for each clock pulse. The outputs of these counters serve as the address for the read only memory, whose outputs are fed to the problem type control circuit 114 as previously discussed.

The master memory clock continues oscillating after all four limb sections are enabled by limb select circuitry 111, and the ROM counter and memory circuit 112 and the set up next problem control circuit 113 continue to increment until the output of the compare circuit included within set up next problem control 113 goes high. At that time, a signal is sent to the memory problem generator control circuit 110 which resets the R-S flip-flop and turns off the master memory clock. The ROM counter and memory circuits 112 are now set up to present the next problem. It is in this way that a sequence of 512 problems is produced. When the first problem is presented, words zero, one, two and three are used in the problem and word four is skipped. For the second problem, words five, six, seven, and eight are used and word nine is skipped. This pattern of usage and skipping continues until the seventh problem is presented. Since the read only memory contains only 32 words, the seventh problem uses words 30 and 31 and then the ROM address is incremented to zero. Therefore, the seventh problem uses words 30, 31, zero and one, while the word two is skipped. In this way, 32 unique problems are presented before the sequence starts to repeat. However, after these 32 problems, the set-up next problem control circuit 113 requires 7 pulses instead of 5 to turn off the memory clock in control circuit 110. Consequently the thirty-third problem uses words zero, one, two and three and skips words four, five and six. The thirty-fourth problem uses words seven, eight, nine and ten and skips words eleven, twelve, and thirteen. Again another 32 problems are presented before the sequence repeats. However, the number of pulses required to turn off the master memory clock is then again increased by two. This continues until the set up next problem control circuit 113 requires 37 pulses to turn off. In other words, it continues for 16 times 32, or 512 problems. Since the ROM address counter is a five bit binary counter, it will reach the same number if presented 37 pulses as it would if presented with five pulses. Consequently, at that stage, the sequence of 512 problems starts over again.

Each time the set up next problem control circuit 113 sends a signal to the memory problem generator control circuit 110, it also sends a signal to increment the problems presented register/buffer circuit 115. The resultant outputs of circuit 115 are compared with the number on thumbwheel switches 46 (FIG. 3) in end of test compare circuit 116. When the respective three-digit numbers are equal, a signal is sent to the start/reset control circuit 90 (FIG. 5), which resets the D flip-flop and disables the master clock AND gate 91. This stops the whole system, which then waits for another depression of start switch 32 (FIG. 3).

Program control switches 33 to 36 (FIG. 3) interact as follows with memory section 71 (FIG. 6).

In problem type control circuit 114, there is an R-S flip-flop which is set or reset depending on the position of override switch 36 (FIG. 3). If this switch is set not to override the memory, the flip-flop operates to permit the problem bits from the ROM to pass unchanged on to the outputs of control circuit 114 and thence to the limb sections. If switch 36 is set to override the memory, the flip-flop operates to cause the solution bits from the ROM to be fed to a four bit binary adder along with another four bit binary number, determined in each case by the positions of the three problem type switches 32 to 35 (FIG. 3). It is the output of this adder which is then passed on to the problem outputs of control circuit 114 and thence to the limb sections. In either case, the solution bits are fed directly from the ROM to the limb sections.

Turning now in more detail to individual limb section 73 (FIG. 8), when the problem latch/decoder circuit 131 and the desired solution latch circuit 130 are strobed by the limb select signal from limb select circuitry 111 (FIG. 6), these decoder and latch circuits accept and store the four problem bits and display four desired solution bits, respectively. The problem latch/decoder circuit 131 then decodes the four bit binary number by selecting one of 15 lines, collectively designated by reference numeral 132 in FIG. 8. These 15 lines are composed of 3 groups of 5, there being one line for each of the 5 problem lamps associated with the limb to which the individual limb section 73 pertains, for each of the 3 types of problem, namely, the match problem type, the one-above type and the one-below type. These 15 lines are used as inputs to the register enable circuit 133 and to display control circuits 134. The register enable circuit 133 determines the type of problem (match, one-above, or one-below) and enables one or another of AND gates, 135, 136, and 137, leading to the respective register/Buffers 138, 139 and 140. If the problem is of one-above or one-below type, register enable circuit 133 also sends a signal to the displayy control circuits 134 identifying that type of problem. These display control circuits 134 determine which one of the 5 problem lamps are to be turned on, and they provide the current sink and buffer to drive that lamp. The one-above and one-below signals from register enable circuit 133 directly drive the current sinks and buffers for the lamps indicating the one-above or one-below problem condition.

It should be noted that desired solution latch circuit 130 is wired together into a common 4-bit bus with all the other desired solution latch circuits on the other individual limb sections 74 through 76. Thus each word from the memory is presented to all four limb sections together. As previously explained, it is the limb select output signal from circuit 111 (FIG. 6) which determines which limb section will store that particular word.

Similarly, the problem latch/decoder circuit 131 is wired together into a common 4-bit bus with the problem latch/decoder circuits of the other individual limb sections, so that again each word from the memory is presented to all four limb sections together. Again it is the limb select output signal which determines which limb section will store a particular word.

The decoder portion of problem latch/decoder circuit 131 consists of a one-of-sixteen decoder. All outputs of the decoder are high except for the one selected by the binary input. Outputs on pins 1 through 5 may be match type problems, on pins 6 through 10 they may be one-below type problems, and on pins 11 through 16 one-above type problems.

Register enable circuit 133 determines the problem type by sensing which group of 5 outputs from circuit 131 has even parity. It then puts out a high level on the proper line enabling the correct one of register/buffers 138, 139, and 140 and turning on the proper driver in display control circuits 134.

When a solution lamp is illuminated by the limb corresponding to individual limb section 73, i.e., by the left hand of the individual being tested operating handle 11 (FIG. 1), the corresponding input from that lamp to the actual solution decoder circuit 141 (FIG. 8) goes high. When this happens, solution decoder circuit 141 puts out a binary number corresponding to the lamp that was illuminated. Decoding of the high signal from any one of the five manipulator solution lamps into a binary number is performed by means of a conventional diode matrix in solution decoder circuit 141.

Compare circuit 142 compares the binary number from actual solution decoder circuit 141 with the binary number stored in desired solution latch circuit 130. When these two binary numbers are the same, compare circuit 142 generates a high level output signal. This condition is indicated in FIG. 8 by the symbols "A = B OUT" at the output of compare circuit 142. This output signal from compare circuit 142 is supplied to sequencer switches 37 to 41 (FIG. 3), through them to sequencer circuit 101 and then to limb select switches 42 to 45 (FIG. 3), where certain control functions discussed below are performed.

It should be noted that the compare circuit output signals from all four individual limb sections 73 to 76 pass through the sequencer switches, through the sequencer circuit, and through the limb select switches, following their own respective paths through these elements. Accordingly, out of limb select switches 42 to 45 come four output signals, respectively representing the four compare circuit output signals, after processing. Each one of these four output signals from limb select switches 42 to 45 is then returned back to its corresponding individual limb section. The one corresponding to individual limb section 73 is shown in FIG. 8 entering variable pulse width discriminator 143 at the input designated "A = B IN." If this A = B IN signal remains high for the length of time set on holding time switch 49 (FIG. 3) which is also inputted to discriminator 143, then a signal is produced which sets an R-S flip-flop. The Q output of this flip-flop is then ANDed with the enable circuit 133 and the proper register/buffer 138, 139 or 140 is triggered. When a new problem is presented, the signal from mode select/present problem circuit 93 which strobes the memory problem generator control circuit 110 also resets the above mentioned R-S flip-flop within discriminator 143. This causes the register/buffer which had previously been triggered to be incremented.

The register/buffer circuits 138, 139 and 140 thus count the number of problems of each type that have been correctly solved and held by the limb which operated the particular limb section in question. The outputs of these registers are buffered to allow multiplex operation of the read-out and display section as described more fully below.

As previously noted the A=B OUT signal from compare circuit 142 is supplied to sequencer switches 37 to 40 (FIG. 5). As indicated in FIG. 5, the four separate A=B OUT signals from the four individual limb sections 73 to 76 are supplied to these switches, respectively.

If the sequencer on switch 41 (FIG. 3) has previously been activated, these compare circuit output signals are fed to the sequencer circuit 101, where the compare outputs must go high in the order set by the sequencer switches 37 to 40 to produce an output. The outputs from sequencer circuit 101 are then sent back to the respective sequencer switches 37 to 40 where they are directed to the respective limb select switches 42 to 45 (FIG. 3). If, on the other hand, the sequencer on switch 41 has not been activated, then the compare circuit outputs from the individual limb sections are fed directly to the limb select switches, without passing through sequencer circuits 101.

The sequencer circuit 101 is internally constructed in conventional manner to provide output signals only when the A=B OUT signals applied to sequencer switches 37 to 40 occur in the order determined by these sequencer switches. For example, this sequencer circuit 101 may function as follows. Initially the A=B OUT signals in all positions are low. This enables a NAND gate leading to an R-S flip-flop in the position 1 output and disables all other flip-flop input NAND gates. When A=B OUT for the first position goes high, the output of that NAND gate goes low, setting the Q output of the position 1 out flip-flop high. This then enables the NAND gate for the position 2 out flip-flop.

When A=B for position 2 goes high, the output of this NAND gate goes low, setting the Q output of its flip-flop high. This then enables the NAND gate for the position 3 out flip-flop. When A=B for position 3 goes high, the output of this NAND gate goes low, setting the Q output of its flip-flop high. This then enables the NAND gate for the position 4 out flip-flop. When A=B for position 4 goes high, the NAND gate output goes low, setting the Q output of the flip-flop high. As can be seen from the above, all A=B inputs must go high in the order set to get outputs from all four R-S flip-flops. If A=B for several positions (but not all four) are high and did go high in the correct order, and then one goes low, all positions after the low one must again go low in order to enable the NAND gates in the proper order again. For example, assume that A=B for positions 1, 2 and 3, are high and went high in the proper order. If A=B position 1 goes low, the Q output of the position 1 out flip-flop goes low. This enables the NAND gate for the position 2 out flip-flop. The position 1 out flip-flop Q output can only go high when its NAND gate output goes low; and this can only occur when A=B for position 2, 3 and 4 are low and A=B for position 1 is high. Therefore to get all flip-flop outputs high again, the A= B signals must return to this state.

As previously mentioned, the output signals from sequencer switches 37 to 40 are supplied to limb select switches 42 to 45, in their respective correspondences. The outputs from limb select switches 42 to 45 in turn go to respective inputs of NAND gate 102 whose output is in turn supplied to variable pulse width discriminator 103 (FIG. 5). As previously stated, those switches determine which limbs are subjected to test. The outputs from the limb select switches 42 to 45 which are "on" also go to the variable pulse width discriminator in each respective individual limb sections 73 to 76, e.g., to variable pulse width discriminator 143 in FIG. 8.

It should be noted that the outputs of limb select switches 42 to 45 will remain high only as long as the corresponding compare circuit output remains high.

The output of the NAND gate 102 leading to discriminator 103 (FIG. 5) will go high only if it is enabled by the mode select/present problem circuit 93 and all compare circuit outputs (A=B out) are also high. It will stay high only as long as all of these signals remain high. The high output from NAND gate 102 is also used to set the R-S flip-flop in the four limbs solved register/buffer 98, in addition to serving as an input to variable pulse width discriminator 103.

With regard to that discriminator, if the output from NAND gate 102 remains high longer than the time set on holding time switch 49 (which is also connected to discriminator 103) that discriminator puts out a signal which sets an R-S flip-flop in the four limbs held register/buffer 97. The Q output of this R-S flip-flop is supplied to the mode select/present problem circuit 93, where it causes a new problem to be presented.

Turning now in more detail to display section 72 shown in FIG. 7, this comprises, as previously noted, a multiplexed oscillator 160. This may be a free running oscillator, operating at approximately 1 KHz and driving a 2 bit binary counter whose output is used as an input to select one of four lines. These outputs are then inverted and used as a four phase clock on the four separate output lines from oscillator 160, respectively.

Also included in display section 72 (FIG. 7) are three drivers and digits circuits 162, 163 and 164, the previously mentioned elapsed time drivers and digits circuit 161, and the circuitry associated with display switch 50 (FIG. 3).

Circuits 162, 163 and 164 energize, respectively, the display digits of displays 60, 61 and 62 (FIG. 3). To this end, they are supplied with the output signals from the register/buffer circuits which generate the information for the displays. A so-called "wire-or" system is used to provide the connections from the register/buffers to the drivers 162, 163 and 164. This involves wiring together the corresponding data leads from each of the register/buffers in question, and connecting the resultant wired-together lead, in turn, to the same input on each of the drivers. This is the significance of the twelve leads shown entering each of circuits 162, 163 and 164. Each individual lead terminating at a particular drivers circuit is connected to the equivalent position in each of the other drivers circuit inputs. For example, the topmost lead into drivers circuit 162 is connected directly to the topmost lead into drivers circuits 163 and 164. This same lead is also connected directly to the corresponding output lead from each register/buffer feeding circuits 162, 163 and 164. The reason why there are shown three groups of four such leads is that the numerical data supplied to the driver circuits consist, in each case, of three four-bit digits, respectively represented by the parallel leads in the different groups of four.

The previously mentioned four phase clock outputs from multiplexed oscillator 160 enable one of the four sets of drivers and digits in display section 72 at a time. When enabled, the digit drivers decode the BCD number presented to them via the data links from the various register/buffers, and turn on the proper segments for each digit in the respective display.

The three phases of the four phase clock from multiplexed oscillator 160, which turn on the drivers circuits 162, 163 and 164, also go through the display switch 50, which is a three pole, five position switch selecting which register/buffers are to be enabled, and thus which information is to be displayed. On the other hand, the elapsed time register/buffer 100 is enabled by the output from multiplexed oscillator 160 without passing through display switch 50. Therefore, the elapsed time digits drivers and digits circuit 161 and the display 63 (FIG. 3) driven by circuit 161 is always being enabled by the four phase clock, regardless of the setting of display switch 50.

Also supplied to drivers and digits circuit 161 to 164 is a signal, when switch 31 (FIG. 3) is depressed, such that all the displays 60 to 63 show the numeral 8 in every digit position. In this way, the alpha-numeric displays are tested for operativeness. To prevent undue complication of the illustrations, the path for this input signal to circuit 161 to 164 has not been shown in FIG. 7.

It will be understood that the elements described above are, in themselves, all of conventional form and that other conventional embodiments thereof may be utilized to perform the corresponding functions.

We claim:
1. A system for testing eye-limb coordination comprising:
means for electronically activating selected visual displays, said electronic activating means compris- ing an electronic read-only memory, and means for activating said memory to put out control signals for sequentially activating different ones of said selected displays, and said read-only memory comprising a counter activated by said memory activating means to produce sequentially increasing number signals and means for transforming said number signals into different signals for activating said selected displays;

limb operable means for selectively actuating visual displays bearing predetermined spatial relation to said electronically activated displays; and means for indicating the attainment of said predetermined relation.

2. The system of claim 1, further characterized in that four sets of electronically activated displays corresponding to four limbs are provided, and in that successive ones of said different signals activate selected displays within different ones of said sets.

3. The system of claim 1, further characterized in that said transforming means skips words forming part of the number signals from said counter in such a pattern that a greater quantity of different number signals are produced than inherent in the word capacity of the counter.

4. The system of claim 2, comprising means for controlling said indicating means to respond only to attainment of said relationship for said different limbs in a predetermined sequence.

5. The system of claim 2, comprising means for controlling the number of limbs for which said predetermined relation is to be obtained.

6. A system for testing eye-limb coordination comprising:

means for electronically activating selected visual displays, there being a plurality of separate sets of said displays corresponding to the different limbs;

limb operable means for selectively actuating visual displays bearing predetermined spatial relation to said electronically activated displays;

means for indicating the attainment of said predetermined relation; and means for controlling said indicating means to respond only to attainment of said relationship for said different limbs in a predetermined sequence.

7. A system for testing eye-limb coordination comprising:

means for electronically activating selected visual displays, there being four separate sets of said displays corresponding to the four different limbs;

four means independently operable by said four limbs, respectively, for selectively actuating four visual displays bearing predetermined spatial relation to said electronically activated displays; and means for indicating the attainment of said predetermined relation by all of said visual displays.

8. A system for testing eye-limb coordination comprising:

means for electronically activating selected visual displays, there being four separate sets of said displays corresponding to the four limbs;

four means independently operable by said four limbs, respectively, for selectively actuating four visual displays bearing predetermined spatial relation to said electronically activated displays;

means for indicating the attainment of said predetermined relation; and means inhibiting said indication of attainment after a predetermined interval following said activation.

* * * * *